Aug. 26, 1924.

S. M. CHASE

BEARING

Filed March 11, 1922    2 Sheets-Sheet 1

1,506,710

Inventor
Sherwood M. Chase
By Toulmin & Toulmin
Attorney

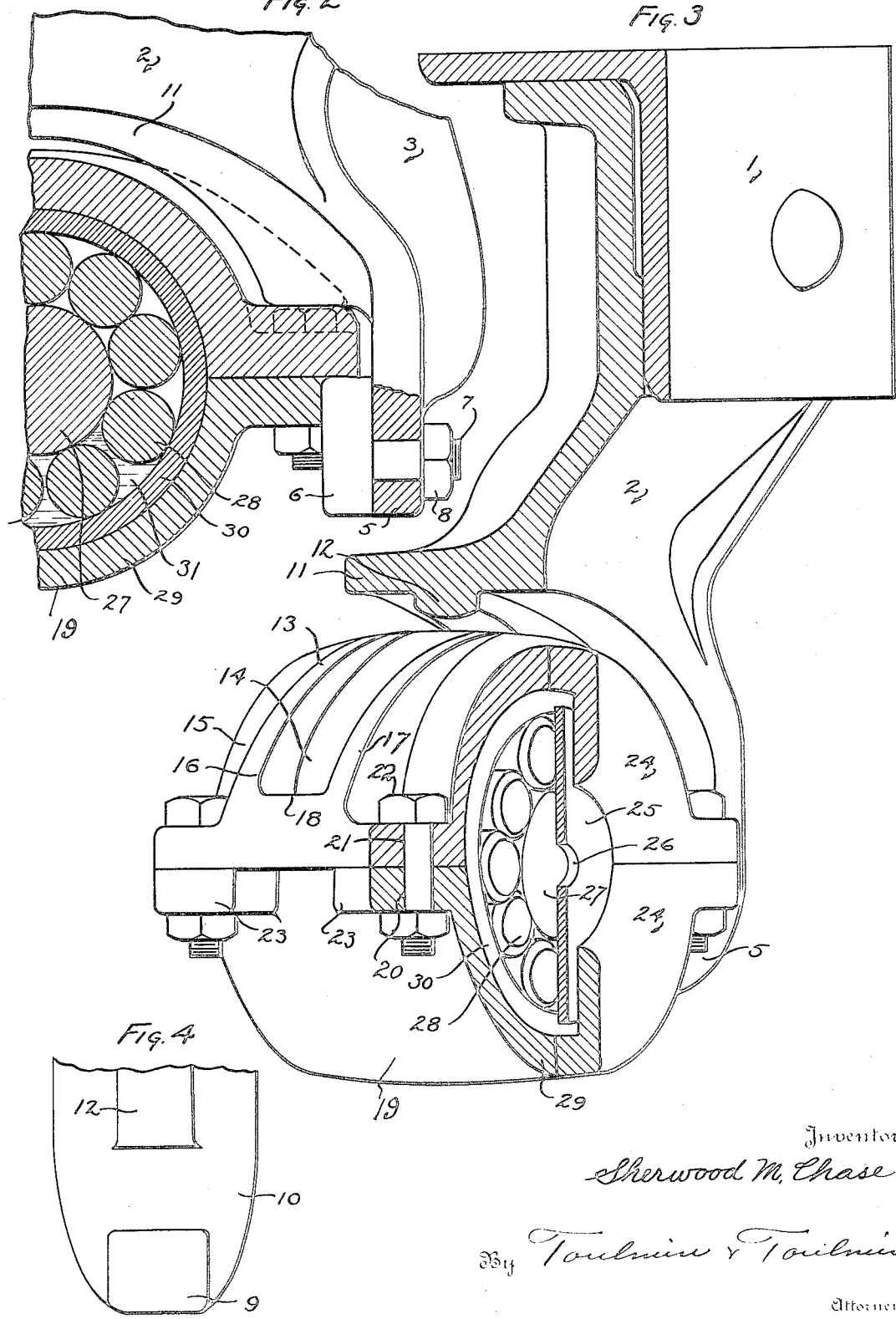

Patented Aug. 26, 1924.

1,506,710

UNITED STATES PATENT OFFICE.

SHERWOOD M. CHASE, OF COLUMBUS, OHIO.

BEARING.

Application filed March 11, 1922. Serial No. 542,833.

*To all whom it may concern:*

Be it known that I, SHERWOOD M. CHASE, a citizen of the United States, residing at Columbus, in the county of Franklin and State of Ohio, have invented certain new and useful Improvements in Bearings, of which the following is a specification, reference being had therein to the accompanying drawing.

-My invention relates to bearings and in particular to bearings for industrial trucks.

The object of my invention is to provide a bearing which will constantly run in oil, and also may be easily filled by unskilled operators.

It is a further object of my invention to provide a means of sealing the bearing against the entrance of dust, dirt and foreign material but at the same time providing a ready means of access for the introduction of oil to the bearing.

It is an additional object of my invention to provide a bearing with a system of bearing members such as rollers which are adapted to constantly shift their position so that each one may pass through the bath of oil. It is a further object to provide such rollers so arranged that their exterior ends will not cut into the shaft being supported nor into the end members of the bearing or the liner thereof.

It is a further object to provide a detachable liner for the bearing which may be renewed when it has become worn, thus providing a very cheap and ready means of maintaining the bearing in its original condition of effectiveness. It is a further object to provide a housing for the bearing which may be readily detached from or assembled with the bearings and which may be adjusted to varying sizes of liners and bearing members.

It is a further object to provide a combination of bearing members, a detachable liner, a bearing housing in a bearing which may contain oil and which may be readily moved as a unit into engagement or out of engagement with a supporting bracket.

It is a further object to provide a means of aligning the casing and the bearing with the bracket and maintaining their alignment to prevent torsional movement while at the same time permitting of movement fore and aft in the vehicle.

Referring to the drawings:

Fig. 2 is a bearing and a part of the bracket in section;

Fig. 3 is a perspective of the bearing and one arm of the bracket;

Fig. 4 is an interior view of the lower end of one of the brackets.

Figure 1:
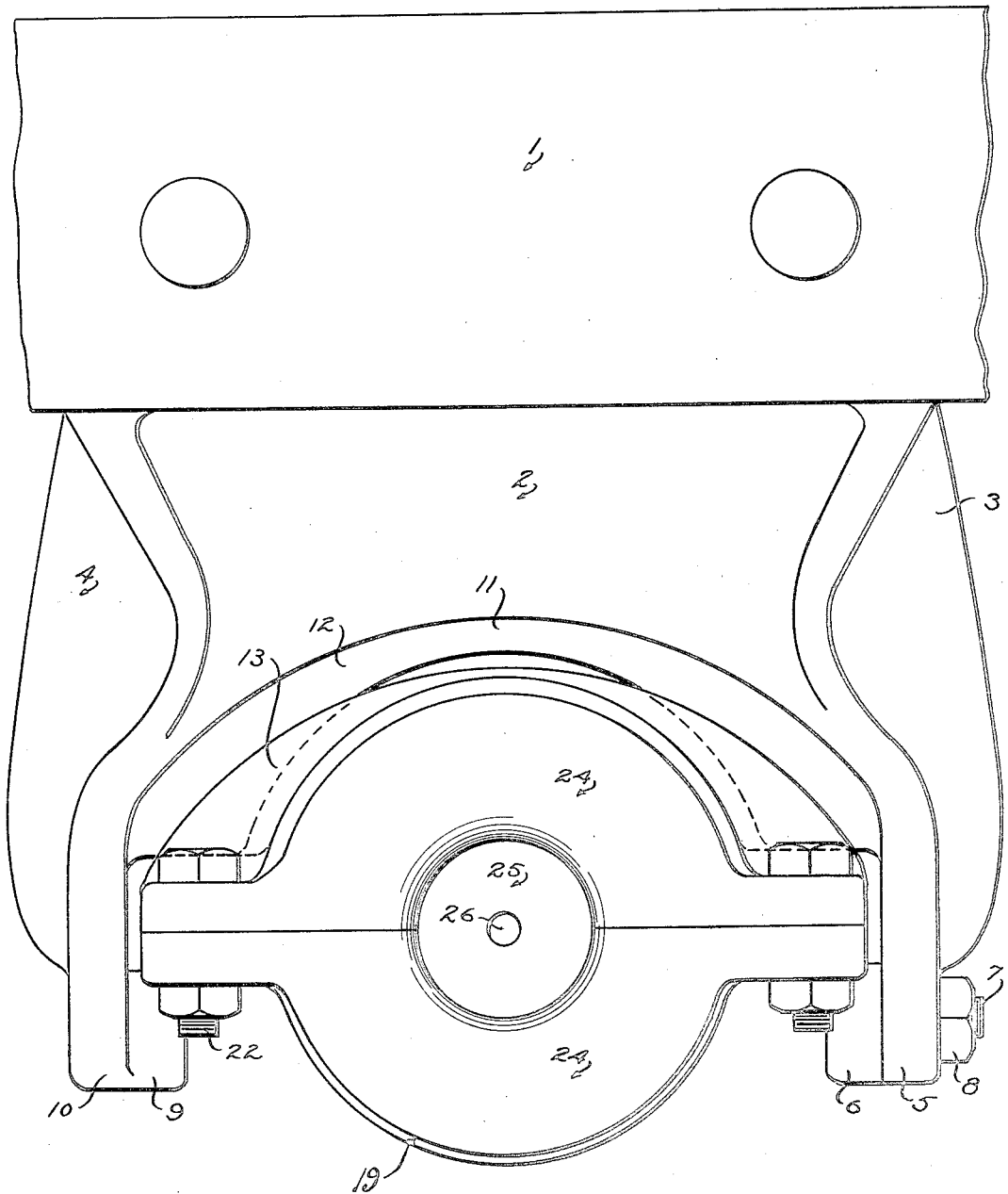
Fig. 1 is a side elevation of the bearing in position in the bracket for operation.

With reference to the drawings and the detail construction illustrated by them, 1 is a side frame member of an industrial car or truck to which is attached a bracket 2 having arms 3 and 4. Arm 3 has a depending portion 5 to which is bolted a lug 6 and retained on 5 by the bolt 7 and nut 8. The arm 4 has a corresponding lug 9, but this lug is integral with the lower end 10 of the arm 4. The arch portion 11 of the bracket 2 has a rib 12 that has an interior surface 13 of a sharper curvature than the arch 11 of the bracket 2. This rib projects into a cutaway portion 14 in the upper half of the bearing casing as at 15, the cutaway portion 14 being formed by a pair of co-operating ribs 16 and 17. The weight of the vehicle through the bracket rests upon the horizontal portions 18 on either end of the upper half 15 of the casing and the lateral movement of the casing is prevented by the engagement of the ribs 16 and 17 with the rib 12. Co-operating with the upper half of 15 is the lower half of 19 that has eyes or bolt holes 20—20 adapted to register with similar bolt holes 21—21 in 15 through which bolts 22 are projected to retain the halves in engagement with one another. The bolt holes 20 pass through spaced lugs 23—23 between which are located the bracket lugs 6 and 9.

The reason for having the detachable lug 6 is to enable the ready installation or removal of the casing with the bearing in the bracket. The end of the casing adjacent the fixed lug is first mounted over that lug and the other end is then raised into position and the detachable lug installed to prevent the removal of the casing from the bracket. The casing is thereby embraced at either end between the lower end 13 of the rib on the bracket and the lugs 9 and 6 respectively. Lateral movement is prevented as mentioned above by the insertion of the rib 12 into the cutaway portion 14 between the ribs 16 and 17 on the bearing casing.

On either end of the respective casing halves are end members 24 which retain a dust plate 25. This dust plate has an aperture 26 through which the nozzle of an oil can may be inserted to place oil in the bearing. At 27 is the shaft or axle surrounded by rollers 28 of the bearing having beveled ends 29 to prevent the end of the bearings from cutting into the shaft or the liner 30 which is detachable from the bearing. The oil inserted through 26 is maintained at about the level indicated in Figure 2, where the oil is designated 31.

In operation the bearing is thus constantly running in oil as the rollers move around between the axle 27 and the liner 30. This provides a cheap, readily renewable and adjustable bearing constantly running in oil and eliminates the great objection to industrial trucks and similar equipment in which oiling systems have been found to be impracticable, due to either their cost or to the degree of attention by skilled persons necessary for their proper maintenance.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In a bearing, a split casing having end members to form a reservoir for oil, bearing members traveling within said casing within said end members in the reservoir of oil and means composing a freely rotatable disk having a centrally disposed opening provided in one end of the bearing for the introduction of oil and the exclusion of foreign material, said bearing members having their ends beveled to prevent injury to the shaft being supported thereby and the bearing casing by the ends of the bearing members.

2. In combination, a bearing consisting of a casing, a bracket having portions thereon upon which said casing rests, one of said portions being detachable for the installation or removal of the bearing, and means on the casing and the bracket for permitting a degree of forward and aft movement of the bearing with respect to the bracket but adapted to prevent lateral movement of the bearing with respect to the bracket.

3. In combination, a bracket having bifurcated ends, a bearing casing adapted to fit therebetween and to be supported at either end thereby, means on said bracket for engaging with the upper portion of said casing to embrace it between the aforementioned supporting ends of the bracket and adapted to prevent lateral movement of said casing, one of said supporting means on the bracket being adapted to be detached for the insertion or removal of the casing.

4. In combination, a bracket with a pair of spaced arms, a lug on the interior of the outer end of each of said arms, a rib between said arms having abrupt terminal ends constituting lugs, a bifurcated casing of a bearing located between said arms, means on the lower half of said casing for engaging with said lugs on either side thereof to prevent lateral movement of the casing, means on the upper half of said casing, for engaging either side of a rib on the lower side of said bracket between the arms, other means on the upper half of the casing engaging the abrupt ends of the rib, and means for retaining the halves of said casing together.

5. In combination, a bifurcated bearing casing having supporting lugs on either side thereof, said casing having end members to form an oil reservoir therebetween within the casing, roller members within the casing travelling through said reservoir, a detachable liner interposed between said roller members and said casing, an end plate freely rotatable within the casing adjacent one of said end members of the casing, and having an aperture to permit of the introduction of oil therethrough into the reservoir.

6. In a device of the kind described, a bracket having spaced depending legs and open at the bottom, one of said legs having a lug projecting fixedly from the inner side of its lower end, the other end of said legs having a similar lug detachably connected thereto, a rib extending between said arms and having its central portion arched and its terminal portions arranged to form abrupt shoulders constituting stop lugs, a bearing casing mounted between said arms and provided with a pair of ribs between which the rib first mentioned lies, said bearing casing having at each side thereof a projecting portion engaging between a respective rib end and one of the lugs on the arms.

In testimony whereof, I affix my signature.

SHERWOOD M. CHASE.